(12) United States Patent
Wood et al.

(10) Patent No.: US 6,421,778 B1
(45) Date of Patent: Jul. 16, 2002

(54) METHOD AND SYSTEM FOR A MODULAR SCALABILITY SYSTEM

(75) Inventors: Stephen V. Wood, Hillsboro; Jeffrey S. McVeigh, Portland, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/467,558

(22) Filed: Dec. 20, 1999

(51) Int. Cl.[7] .............................................. G06F 9/00
(52) U.S. Cl. ......................................... 713/100; 717/11
(58) Field of Search ............................ 713/1, 2, 100; 717/11

(56) References Cited

U.S. PATENT DOCUMENTS

| | | | | |
|---|---|---|---|---|
| 5,335,321 A | * | 8/1994 | Harney et al. | 395/503 |
| 5,640,543 A | * | 6/1997 | Farrell et al. | 395/502 |
| 5,719,854 A | * | 2/1998 | Choudhury et al. | 370/231 |
| 5,925,104 A | * | 7/1999 | Elbers | 709/231 |
| 6,321,263 B1 | * | 11/2001 | Luzzi et al. | 709/224 |

* cited by examiner

Primary Examiner—Dennis M. Butler
(74) Attorney, Agent, or Firm—Kenyon & Kenyon

(57) ABSTRACT

A method and system are disclosed for a modular, application-independent program that provides for scalability. The system parameters, that is one or more features, each feature having one or more settings, and each setting having a corresponding tag, cost, and benefit, are initialized by a scalable application program. The scalability program can set all the features to their default settings, the default settings being the settings whose costs and benefits equal zero. The scalability program can also update these system parameters after a parameter change (e.g., a feature or setting is added or removed). The scalability program can find the optimum combination of settings after the amount of available resources changes or after a parameter change. The scalability program can also report to the application program the optimal setting for a specific feature.

27 Claims, 13 Drawing Sheets

Scalability System Program

1. Initialize System (Feature, Setting, Tag, Cost, Benefit)

2. Set Defaults (Feature, Tag)

3. Update Features (New_or_Old_Feature, New_Setting, New_Tag, New_Cost, New_Benefit)

4. Recalculate Settings (New_Resource_Value)

5. Report Settings (Feature)

Scalability System Program

1. Initialize System (Feature, Setting, Tag, Cost, Benefit)

2. Set Defaults (Feature, Tag)

3. Update Features (New_or_Old_Feature, New_Setting, New_Tag, New_Cost, New_Benefit)

4. Recalculate Settings (New_Resource_Value)

5. Report Settings (Feature)

*Fig. 2*

METHOD AND SYSTEM FOR A MODULAR SCALABILITY SYSTEM

BACKGROUND OF THE INVENTION

I. Field of the Invention

This invention relates generally to the field of computer systems. More specifically, the present invention relates to a method and system for implementing a modular scalability system.

II. Background Information

The amount of resources available to an application program executing on a computer system varies. For example, processor and memory resources vary widely by platform and environment. A common problem is how to achieve optimal behavior when resources vary, either statically (resources vary from one platform to another) or dynamically (resources vary on a platform depending on the resource needs of the applications executing). For adapting statically, if the user has a computer with a fast processor, he or she wants to use the processor to its full potential. Conversely, if the user has a computer with an older processor or a slower connection, he or she wants to handle new games, browsers, and applications to the best of its ability. For adapting dynamically, if a certain resource (such as a plug-n-play sound card; Plug and Play Industry Standard Architecture (ISA) Specification, Version 1.0a) is added to the computer system as the application is executing then the application should recognize this resource and take advantage of it.

Because of the varying processing powers of different devices, applications should be written such that they adapt to various environments. Applications running on environments with greater resources (e.g. processing power) should provide greater benefits (e.g. performance). An application that cannot adapt to its environment and provide greater benefits as more resources become available has several drawbacks including not fully using the computer's capabilities, and requiring the developer to write many versions of the code in order to accommodate the different platforms on which it may execute.

Without any type of application program adaption capabilities, the application program is built for the slowest machine. Users on faster machines will not have an advantage over users on slower machines when applications are built this way. So as technology improves, the likelihood of users having a positive experience with these applications steadily decreases, forcing developers to rewrite these applications for the faster machines in order to take advantage of its rich resources such as a faster processor and other hardware that allows richer graphics, audio, etc.

Scalability allows an application program to execute at its maximum performance given the limited amount of resources available. Scalability accommodates all types of computer systems, from the system with weak capabilities to a system with great capabilities by maximizing system performance to the computing power and speed of a particular user's equipment. Users with higher-end machines automatically get a better experience with scalability capability by taking direct advantage of higher quality graphics, video, and sound, as well as more sound, more video, and more graphics per application. However, a user on a slower machine can still run the same application and receive a level of performance that is as good as possible for the setup. This is invaluable to developers since multiple versions are not needed for scaling to occur; developers need only write one version of their software for all users. Further, scalability gives applications longer shelf life because latent features and increased functionality can emerge as digital technology advances.

In a video context, scalability provides the ability to vary the information content of a program by changing the amount of data that is stored, transmitted or displayed. In the case of digital video files, it is possible to compress those files, distribute them by compact disc or the Internet and then play those compressed files on the destination computer. Clips encoded are compressed to provide the very best quality and overall frame rate. However, without scalability, there is no flexibility in terms of frame quality and frame rate. There is no way to sacrifice frame quality for a higher data rate. Likewise, there is no way to playback the video at a different frame rate than the one it was encoded.

With regards to Internet video streaming applications, scalability allows the video to appear in real time. These applications have a potential problem because the bandwidth available for transferring data is constantly changing. When the bandwidth available on the network is large, the user can download data to his or her computer in real time. However, if more users access the Internet then the bandwidth available for transferring data decreases and the delay might cause the video to no longer appear real time. In this case, scalability is desirable in order to decrease the quality level but improve the data rate in order to again have the video appear in real time.

An important attribute would be to implement the scalability enabling code in a modular fashion. Modularity allows the scalability system to be application independent and thus be used by various scalable applications. Applications currently exist which are scalable, however, the scalability feature is built into these applications. For example, Intel's Indeo® Video 4.4 program compresses video in a way that allows playback visual quality to vary automatically, based on the playback system's available processing power. This scalability feature, however, is embedded into the Indeo® program and is not application independent but rather can only be used by this application.

An independent, stand-alone scalability system is needed in order to allow the application program to be scalable without having to write the scalability enabling code into each scalable application. Modularity reduces the amount of code that needs to be written and also the total amount of code required to enable scalability in an environment where multiple scalable applications are executing.

For the foregoing reasons, there is a need to have a scalable system program that is modular, configurable, dynamic, and can be easily used by an application with scalability capabilities.

SUMMARY OF THE INVENTION

This invention discloses a method and system for implementing a modular, application-independent scalability system whose system parameters are initialized by values provided from a scalable application program. The scalability system, for each of the system parameters, sets it to a default setting. That system updates the set of system parameters after a parameter change (e.g. a parameter is added or removed). The system also finds an optimum set of system parameters after a change in the amount of resources available or the system parameter change (e.g. a parameter is added or removed). The system also reports one or more of the optimum system parameters after a change in the amount of resources available or a system parameter change.

BRIEF DESCRIPTION OF THE DRAWINGS

FIG. 2 is a text illustrating the routines involved in an embodiment of the present invention.

DETAILED DESCRIPTION

I. Overview

Figure 1:
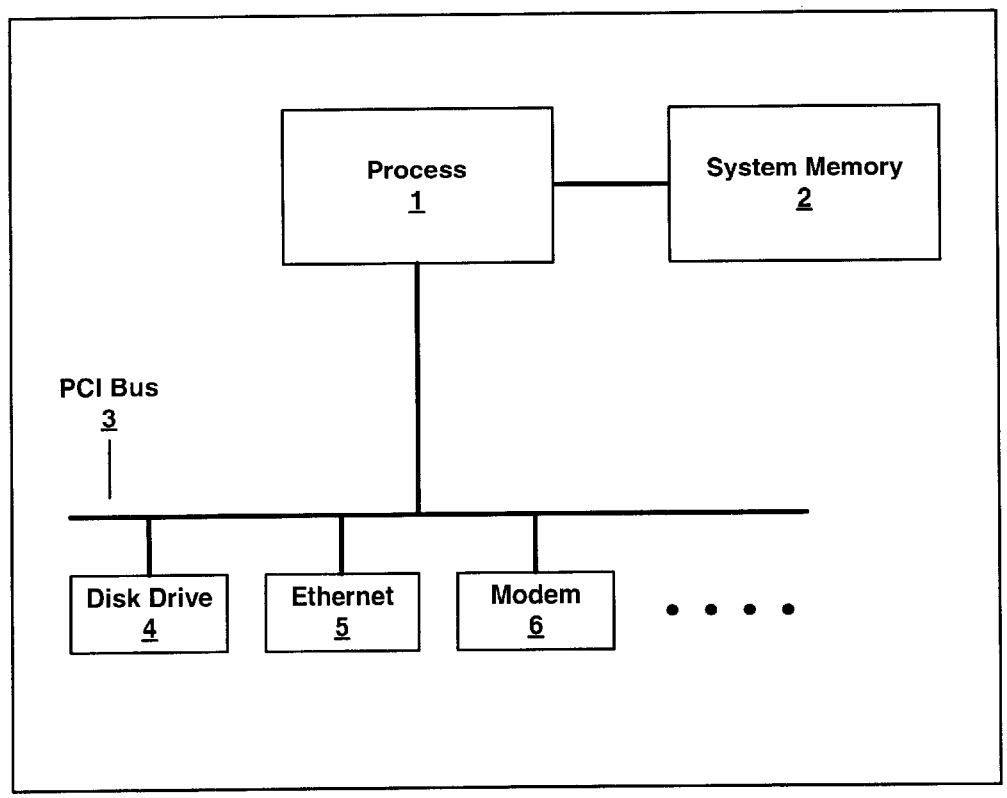
FIG. 1 is a block diagram illustrating a computer system according to an embodiment of the present invention.

This invention, a scalability system, provides scalability by calculating the most efficient combination of settings for the features of a system given that only a limited amount of resources are available. This invention is also modular because it isolates the scalability enabling code into a single module which is application-independent. The same scalability module can be used by any application. This invention provides scalability for various systems and applications such as video applications, audio applications, Internet video streaming (real-time transmission and playback over the network), video download (downloading video files from a Web server), and network management systems.

In a typical system, a scalable application program will contain one or more features, each of which has different settings to be selected based on the availability of the resources. When more of the resource is available, a setting is selected with a higher cost of the resource and which produces some increased benefit.

The scalable application program sends to the scalability system the costs and benefits associated with the various settings of a feature. Cost and benefit information are not included within the scalability system in order to allow the scalability system to maintain its modularity.

The scalability system includes the concept of a baseline. The baseline is when all features are at their default settings. The default settings always have a cost value of 0.00 and a benefit value of 0.00. The cost values of the other settings are relative to the baseline in terms of percentages. For example, if the cost value for a certain setting is 0.05 then this means that it takes 5% more of the resource for this setting compared to the baseline setting. If the cost value for a certain setting is −0.11 then this means that it takes 11% less of the resource for this setting compared to the baseline setting. The benefit values are relative to the baseline in the same manner. All cost values must relate to the same resource, and all benefit values must relate to the same measurement.

A tag value distinguishes between the settings of a feature. The assignment of the tag value to the specific setting is specified by the scalable application program along with the setting, cost, and benefit values. The scalability system returns a tag value to the scalable application program to indicate a particular setting.

As an example, suppose a video encoder has the following characteristics:

| Feature | Setting | Tag | Cost (Processor MIPS) | Benefit (Bitrate) |
|---|---|---|---|---|
| Motion Estimation Search Range | 15 × 7 | 0 | −0.11 | −0.03 |
|  | 31 × 15 | 1 | 0.00 | 0.00 (Baseline) |
|  | 31 × 31 | 2 | 0.07 | 0.01 |
| DCT Precision | Integer | 0 | 0.00 | 0.00 (Baseline) |
|  | Floating Point | 1 | 0.02 | 0.01 |

In this example, cost values are in terms of central processing unit millions of instructions per second ("processor MIPS"), and benefit values are in terms of bitrate. The more processor MIPS available, the more compression that can be done in order to create a better compressed file. Increasing the window size of the search range (from for example, 15×7 to 31×31) is one way to improve quality in video processing. The encoder could have different levels of motion estimation search range based on the processor MIPS available. When there are more processor MIPS, a larger search range could be enabled, resulting in higher visual quality at a fixed bitrate (or lower bitrate for the same quality). Another means of improving video quality is to get higher precision in calculations based on the setting for Discrete Cosine Transform ("DCT") Precision. For the DCT Precision feature, the higher precision of the Floating Point setting gives better video quality than the lower precision Integer setting. In this example, the features are Motion Estimation Search Range and DCT Precision, the settings are the search range possibilities (e.g. 15×7, 31×15, or 31×31) or the precision (e.g. Integer or Floating Point), the costs are the percent of processor resources needed above or below the baseline, and the benefits are the percent of bitrate above or below the baseline.

Here, the baseline is the settings where Motion Estimation Search Range is 31×15 and DCT Precision is Integer because these settings have cost and benefit values of zero. If there is not enough processor resources available, the Motion Estimation Search Range setting could change to 15×7, using 11% less processor MIPS (i.e., 11% less processor resources), but having a 3% negative impact on bitrate. If more processor resources become available, the scalability system would select DCT Precision of Floating Point before Motion Estimation Search Range of 31×31 because for the same benefit, the DCT Precision has a smaller cost and equivalent benefit.

If the settings for both features are at the baseline and the amount of resources available increases from the baseline to 0.10 (10% above baseline) then the setting for Motion Estimation Search Range changes to 31×31 and the setting for DCT Precision changes to Floating Point. If the setting for Motion Estimation Search Range is 31×31 and the setting for DCT Precision is Floating Point and the amount of resource available decreases to −0.5 (5% below baseline) then the setting for Motion Estimation Search Range would need to change to 5×7. If the setting for Motion Estimation Search Range is 31×31 and the setting for DCT Precision is Floating Point and the amount of resource available decreases to −0.10 (10% below baseline) then the setting for Motion Estimation Search Range would need to change to 15×7 and the setting for DCT Precision would need to change to Integer.

II. Operation of the Modular Scalability System

Reference will now be made in detail to embodiments of the invention, examples of which are illustrated in the accompanying drawings. While the invention will be described in conjunction with the embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Referring to the figures in which like numerals indicate like elements, FIG. 1 is a block diagram illustrating a computer system according to an embodiment of the present invention. Computer system 10 shown in FIG. 1 includes a central processing unit ("processor") 1 connected to a system memory 2 and a standard PCI bus 3 (Peripheral Component Interconnect, Version 2.2, 1999). Processor 1 executes instructions and controls the operation of computer system 10. Processor 1 may be, for example, a Pentium(®)III processor available from Intel Corporation. Computer system 10 also contains system memory 2 where data and programs are stored, and PCI bus 3 that routes signals between processor 1, various other chips on the motherboard, and cards that are plugged into its bus slot connections. Hard disk interface cards and network interface cards plugged into the bus slot connections of PCI bus 3 attach processor 1 to a wide variety of input/output devices such as a disk drive 4, an Ethernet network 5 (IEEE standard 802.3), and a modem 6. Disk drive 4 is where programs and data are kept for the long term in contrast to system memory 2 where programs and data are kept for the short term, usually only until processor 1 can process them. Ethernet network 6 and modem 7 are delivery networks which deliver information at differing bandwidths. Delivery by modem 7 is at the rate of a few tens of kilobits per second but delivery by Ethernet network 6 can be at the rate of ten million bits per second.

FIG. 2 refers to an embodiment of the scalability system which is composed of the following five routines: InitializeSystem( ), SetDefaults( ), UpdateFeatures( ), RecalculateSettings( ), and ReportSettings( ). The InitializeSystem( ) routine initializes the scalability system program with values for features, settings, tags, costs, and benefits. The SetDefaults( ) routine sets all of the features of the system to the baseline setting, that is, the setting where the cost equals zero and the benefit equals zero. The UpdateFeatures( ) routine adds, removes, or modifies a feature or setting and its associated tag, cost, and benefit values. This routine also adds or removes the feature from an optimal settings data store 215. This data store contains the optimal set of settings that provides the greatest benefit given the limited amount of resources (i.e., the combination of settings, one setting for each of the features, that provide the greatest benefit given that the cost for this combination of settings is less than or equal to the amount of resources available). This data store contains, for each feature, the setting and its corresponding tag, cost, and benefit. The RecalculateSettings( ) routine finds the optimal setting for each of the features. The ReportSettings( ) routine returns the tag value corresponding to the optimal setting for a specified feature.

Figure 3:
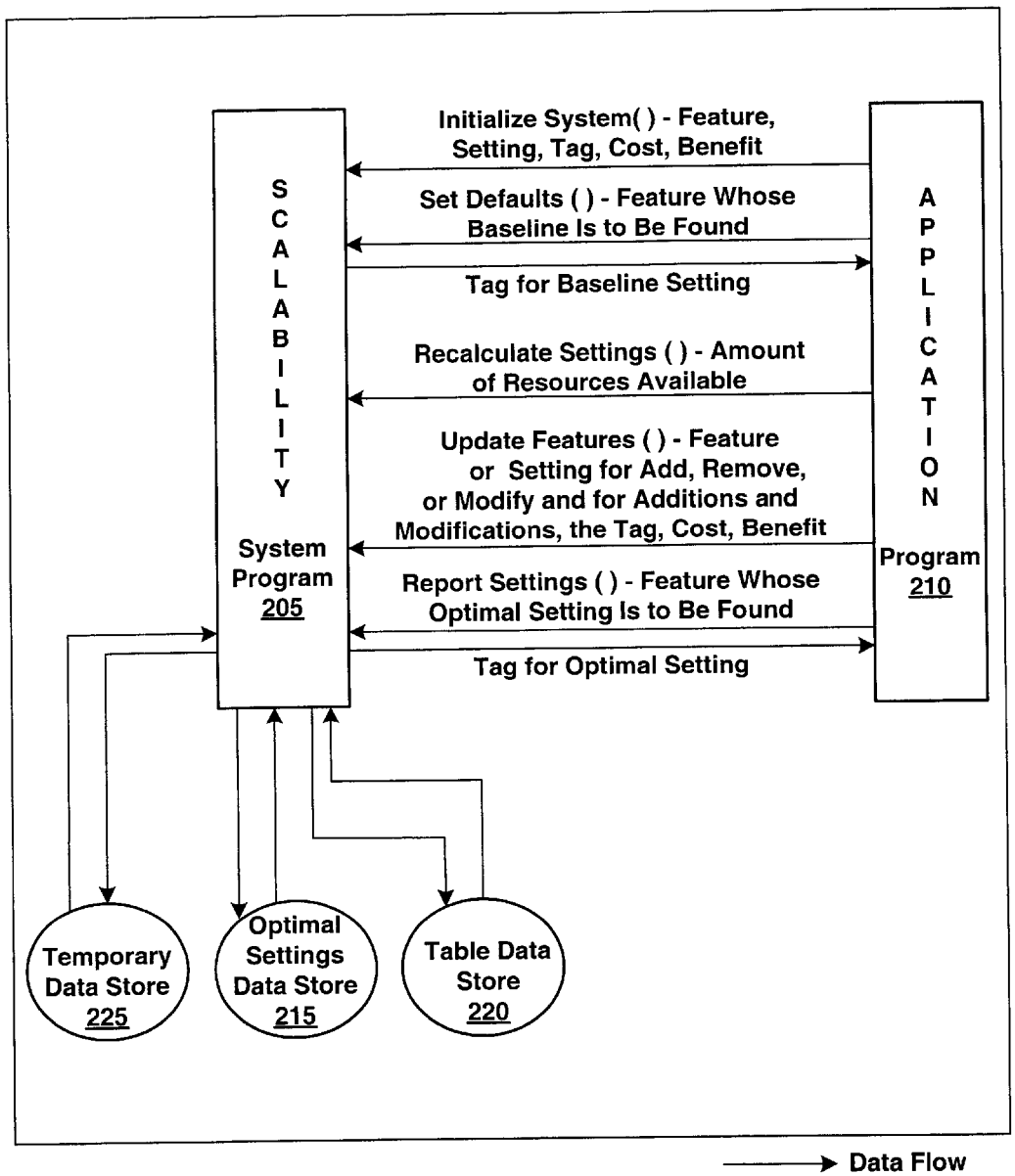
FIG. 3 is a block diagram illustrating a scalability system according to an embodiment of the present invention.

Referring to FIG. 3, in one embodiment of the present invention, two programs are executing—a scalability system program ("System") 205 and an application program ("Application") 210. These two programs reside on system memory 2. Application 210 calls System 205 at among other times: (1) upon system initialization to provide values for the costs, benefits, and tags for each of the settings; (2) in order to set all the features to its default setting; (3) in order to update System 205 after a setting or a feature is added or removed; (4) upon Application 210 detecting a change in the amount of system resources available, at which point, System 205 can recalculate the optimal combination of settings; (5) after a feature or setting is added or removed, at which point, System 205 can recalculate the optimal combination of settings; or (6) upon Application 210 wanting the tag value for the optimal setting of a feature.

In FIG. 3, with regards to the data passed between Application 210 and System 205, for InitializeSystem( ), Application 210 calls System 205 to send it initial values and these initial values are stored in a table data store 220. Table data store 220 can reside, for example, on hard disk 4 or system memory 2. During this call, Application 210 sends to System 205 the initial values for the following parameters: features (one or more unique, attractive, or desirable properties of software or hardware), settings (one or more modes of the feature), tags (arbitrary values assigned by Application 210 to a particular setting and which System 205 returns to indicate that particular setting), cost (the amount of a resource needed to execute the setting where it is expressed as the percent more or less of the resource needed for this setting compared to the baseline), and benefit (the performance achieved by this setting expressed as the percent more or less of performance achieved compared to the baseline).

For SetDefaults( ), Application 210 calls System 205 to initialize one or more features to the default setting (the setting where the cost equals zero and the benefit equals zero). With regards to the data passed between the application program and the scalability system, Application 210 passes to System 205 one or more features whose settings are to be set to the default setting.

For RecalculateSettings( ), Application 210 also calls System 205 in order to recalculate the optimum settings for each feature after the amount of available resources change, after a feature or setting is added, after a feature or setting is removed, or after the cost and/or benefit values for a setting are changed. With regards to the data passed between the application program and the scalability system, Application 210 sends to System 205 the amount of resources currently available. After System 205 determines the optimal settings for all the features, it writes those optimal settings to optimal settings data store 215. Optimal settings data store 215 is a data store containing features where each feature has one setting, tag, cost, and benefit and that setting represents the optimal setting for that specific feature.

For UpdateFeatures( ), Application 210 calls System 205 in order to add, remove, or modify a feature or setting in table data store 220. With regards to the data passed between the application program and the scalability system, if a feature is to be added, then Application 210 sends to System 205 the new feature, setting, tag, cost, and benefit values. If a feature is to be removed, then Application 210 sends to System 205 the feature which is to be removed. If a setting is to be added, then Application 210 sends to System 205 the new feature, setting, tag, cost, and benefit values. If a setting is to be removed, then Application 210 sends to System 205 the feature and setting to be removed. If a setting is to be modified, then Application 210 sends to System 205 the feature, setting, tag, new cost, and new benefit values.

For ReportSettings( ), Application 210 calls System 205 in order to get the tag for the optimal setting of a feature. With regards to the data passed between the application program and the scalability system, System 205 returns to Application 210 the tag for the optimal setting for a feature that Application 210 specified.

The following is a detailed description of the routines which comprise System 205 according to an embodiment of the present invention.

A. InitializeSystem( ) Portion of Scalability System

Figure 4:
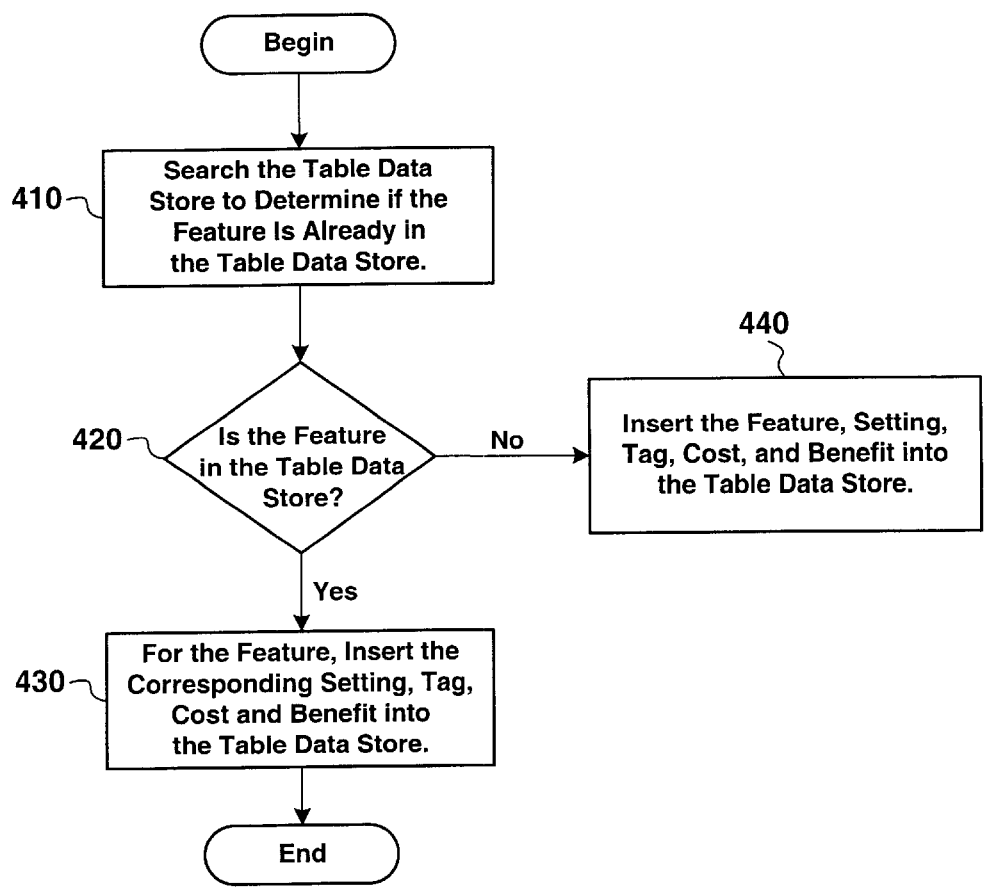
FIG. 4 is a flowchart illustrating the steps used to initialize the scalability system according to an embodiment of the present invention.

System 205 does not need to calculate the cost or benefit of a particular setting of a feature; Application 210 provides System 205 with these values. Referring to FIG. 4, in one embodiment of the routine InitializeSystem( ), Application 210 informs System 205 about the computer system's configuration by sending it initial values for a setting of a feature, and that setting's corresponding tag, cost, and benefit. System 205 is initialized one setting at a time (in the above example, this would result in five function calls, one for each of the five different settings of Motion Estimation Search Range and DCT Precision). In step 410, System 205 searches table data store 220 to determine if the feature is already in that data store. In step 420, System 205 determines if the feature was found in the data store. If the feature is not found in the data store, then in step 440, System 205 inserts the feature, setting, tag, cost, and benefit into table data store 220. If the feature is found, then in step 440, System 205 inserts into table data store 220 for that feature its corresponding setting, tag, cost, and benefit.

As stated earlier, each feature has a baseline where the cost equals zero and the benefit equals zero. Application 210 can calculate the non-baseline values by, for example, at startup, Application 210 can measure System 205 by fixing all of the settings except one and then calculating the cost and benefit for this setting. For instance, in the above example, Application 210 can calculate the cost and benefit values for the 15×7 setting by first, measuring the cost and benefit when all the settings are at the baseline. Then, the setting for the Motion Estimation Search Range feature is moved to 15×7. After the setting is set to 15×7, the cost and benefit for this new setting is measured. The values for cost and benefit obtained when the setting is at 15×7 is then subtracted by the cost and benefit values at the baseline and the result of the subtraction is then divided by the baseline cost and benefit values to get the cost and benefit values sent to System 205 for the 15×7 setting. Thus, the cost values sent to System 205 are expressed as the percent more or less of the resource required for the setting compared to the baseline. The benefit values sent to System 205 are expressed as the percent more or less of the performance achieved compared to the baseline.

B. SetDefaults( ) Portion of Scalability System

Figure 5:
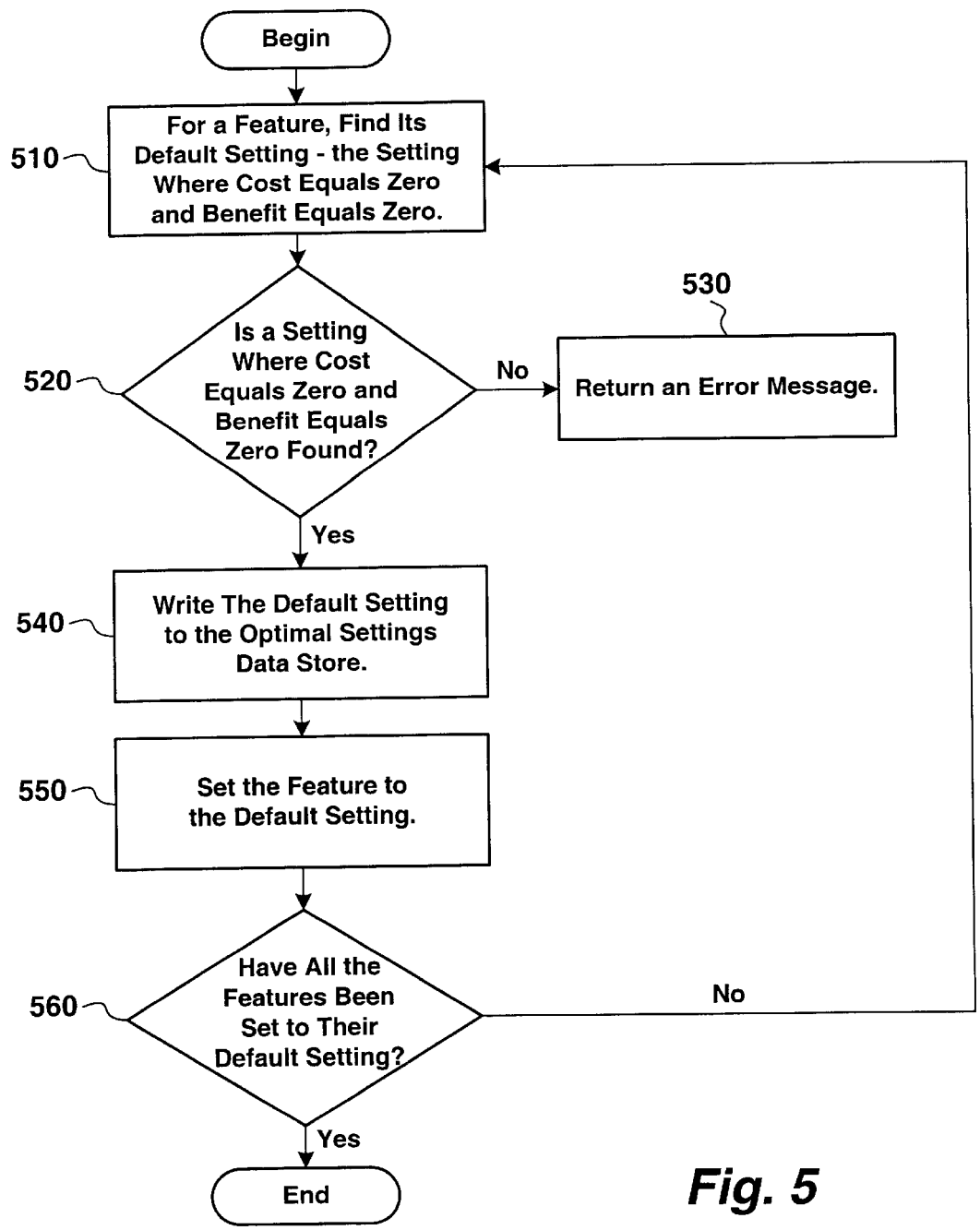
FIG. 5 is a flowchart illustrating the steps required to place the features of the scalability system in a default state according to an embodiment of the present invention.

After all the initial values for the various parameters are input, System 205 finds the baseline (default setting) for each feature by finding the setting for each feature whose cost equals zero and benefit equals zero. Referring to FIG. 5, in one embodiment for SetDefaults, Application 210 calls SetDefaults( ) in order to set all the features to their default settings. In step 510, for a feature, System 205 finds the default setting, that is, the setting where the cost equals zero and the benefit equals zero.

In step 520, System 205 determines if the feature has a default setting, that is, for the feature, System 205 determines whether a setting exists whose cost equals zero and benefit equals zero. If the default setting is not found, then in step 530, System 205 returns an error message. If the default setting is found, then in step 540, System 205 writes the default setting to optimal settings data store 215. In step 550, System 205 sets the feature to its default setting. In step 560, System 205 determines whether all the features have been set to their default setting. If all the features have not been set to their default setting, then System 205 returns to step 510 in order to set another feature to its default setting. When all the features are set to their default setting, the SetDefaults( ) routine is complete.

C. UpdateFeatures( ) Portion of Scalability System

Application 210 calls UpdateFeatures( ) in order to add or remove a feature or setting and the corresponding tag, cost and benefit to or from table data store 220. In one embodiment, the values input into UpdateFeatures( ) are feature, setting, tag, cost, benefit, whether the operation involves a feature or a setting, and whether to add or remove that feature or setting.

Figure 6A:
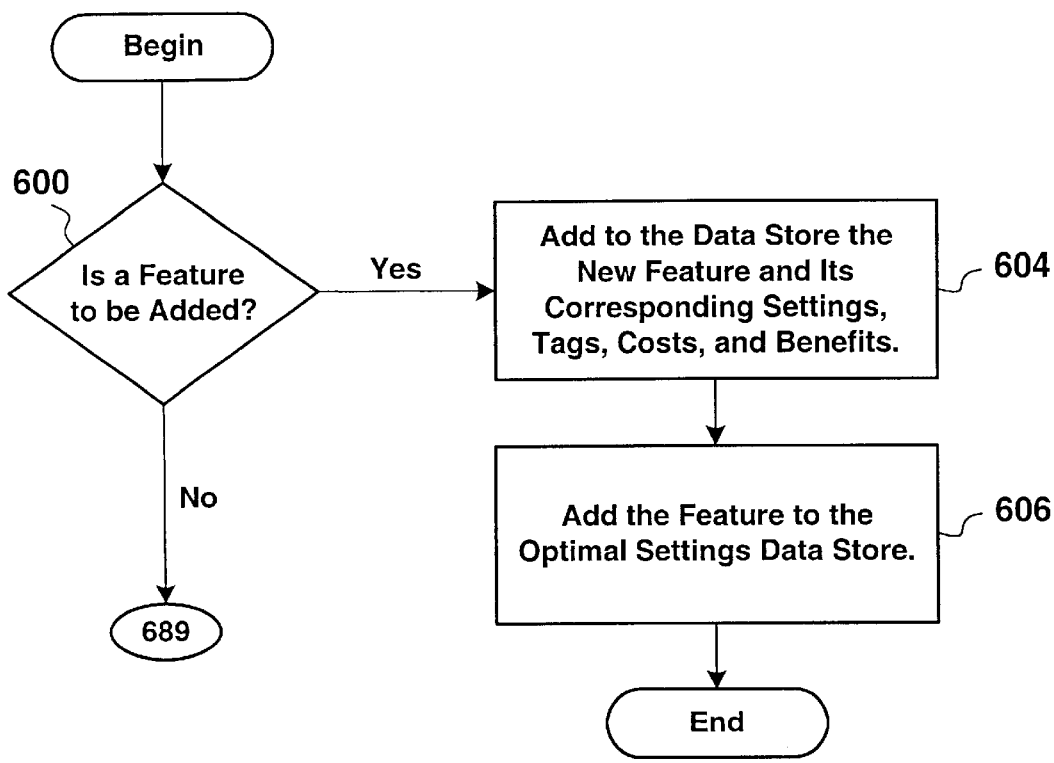
FIG. 6a is a flowchart illustrating the steps required to add a feature to the scalability system according to an embodiment of the present invention.

Referring to FIG. 6a, in this embodiment, UpdateFeatures( ) in step 600 determines if a feature is to be added. If a feature is to be added, then in step 604, System 205 adds the feature and its corresponding settings, tags, costs, and benefits to that data store. In step 606, when a new feature is added, that feature is also added to optimal settings data store 215.

Figure 6B:
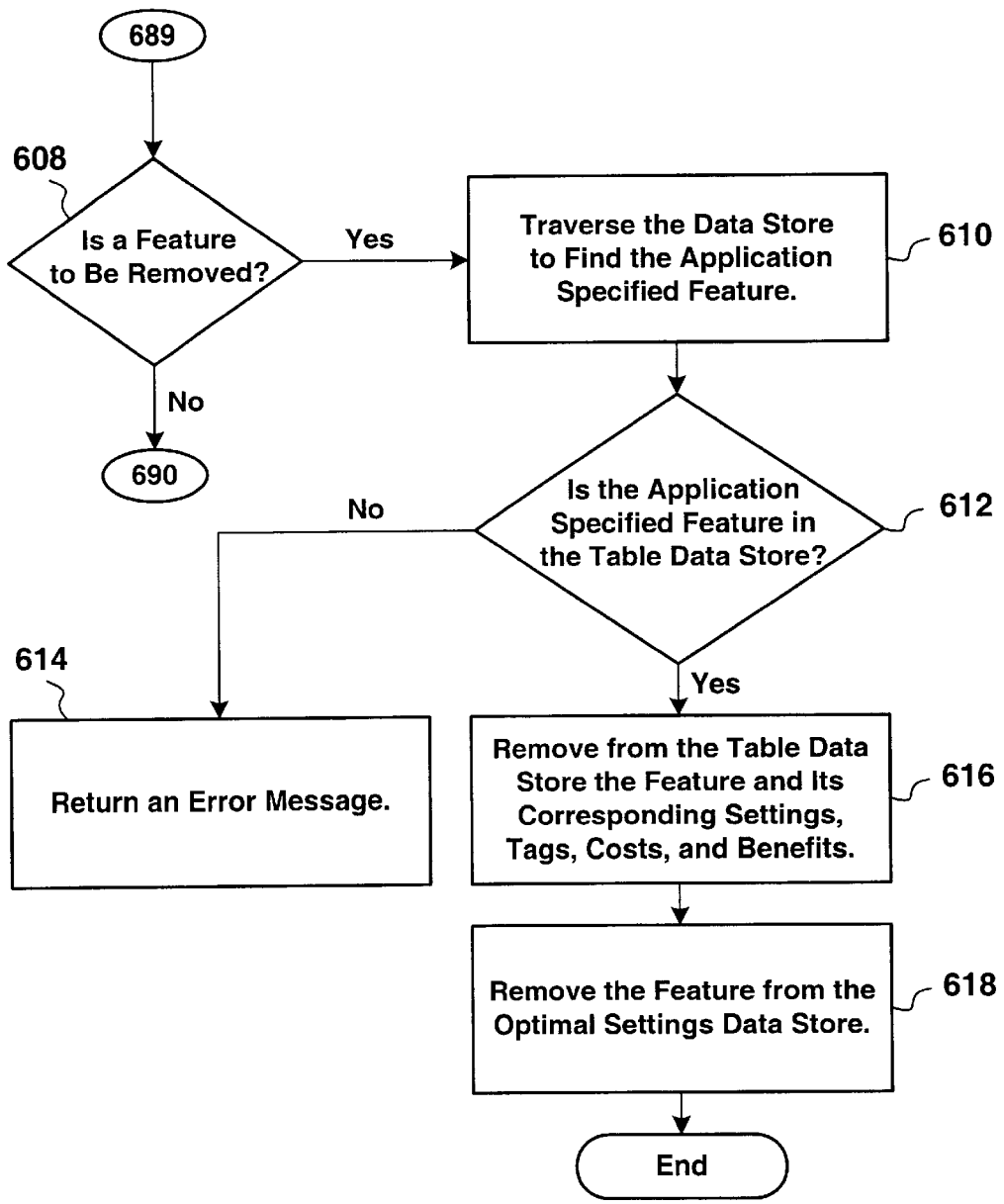
FIG. 6b is a flowchart illustrating the steps required to remove a feature from the scalability system according to an embodiment of the present invention.

Referring to FIG. 6b, System 205 in step 608 determines if a feature is to be removed. If a feature is to be removed, then in step 610, System 205 traverses table data store 220 and searches for the application specified feature. In step 612, System 205 determines if the application specified feature is in table data store 220. If the application specified feature is found, then in step 616, System 205 removes the feature and its corresponding settings, tags, costs, and benefits from table data store 220 and in step 618, removes the feature from optimal settings data store 215. If the application specified feature is not found, then in step 614, System 205 returns an error message.

Figure 6C:
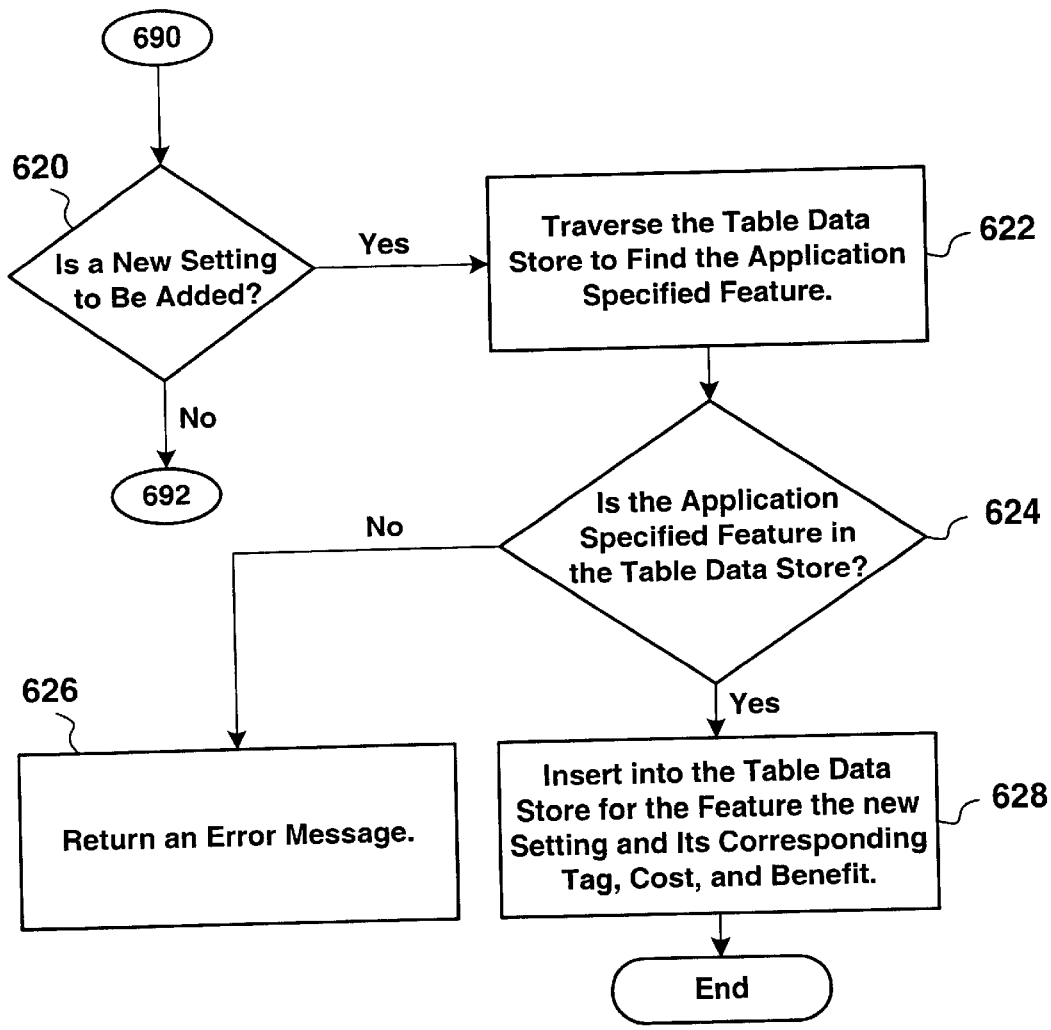
FIG. 6c is a flowchart illustrating the steps required to add a new setting to the scalability system according to an embodiment of the present invention.

Referring to FIG. 6c, in step 620, System 205 determines if a setting is to be added. If a new setting is to be added, then in step 622, System 205 traverses table data store 220 until it finds the application specified feature. In step 624, System 205 determines if the application specified feature is in table data store 220. If the application specified feature is found in that data store, then in step 628, the setting and its corresponding tag, cost, and benefit are added to the application specified feature. If the application specified feature is not found in table data store 220, then in step 626, System 205 returns an error message.

Figure 6D:
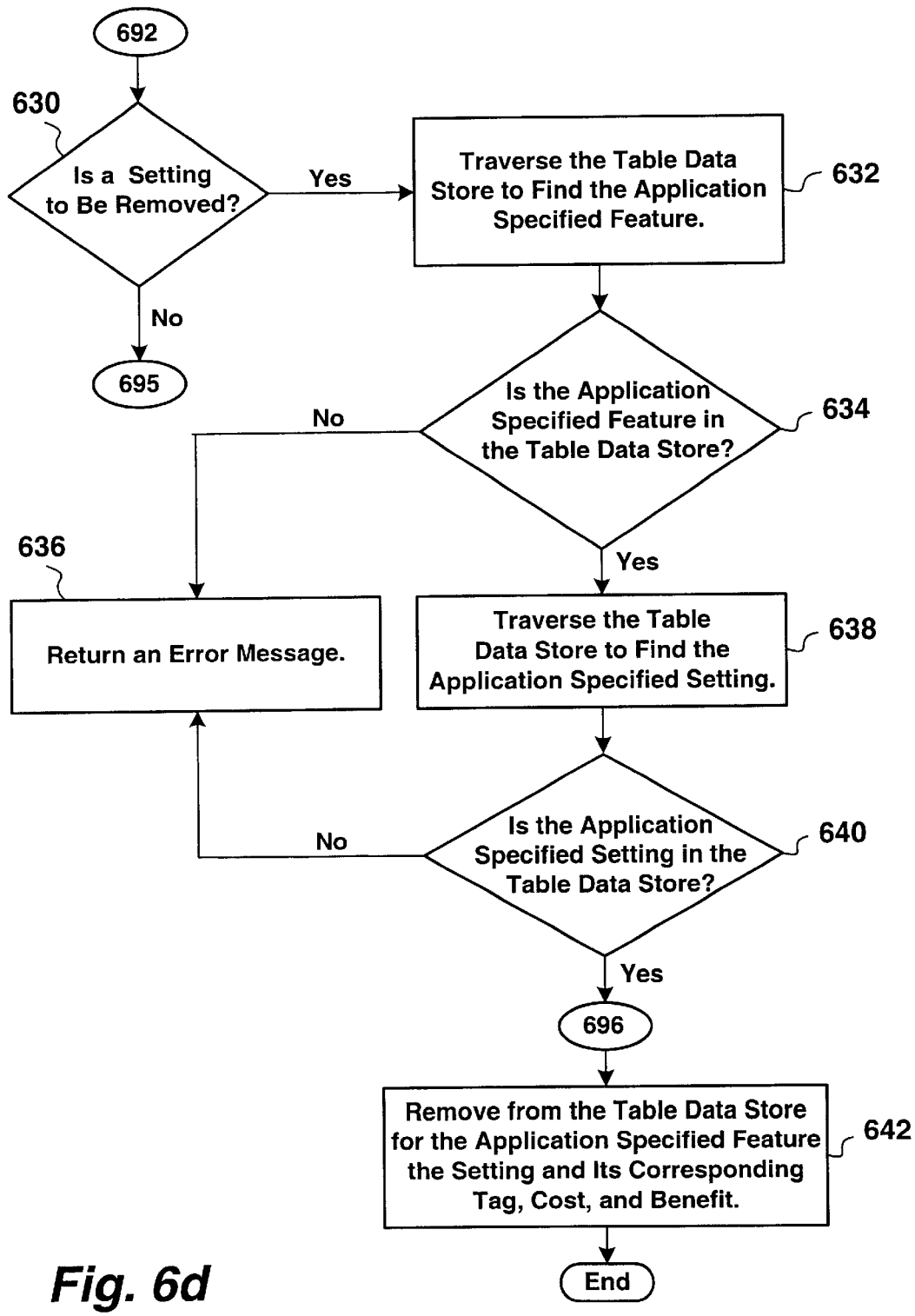
FIG. 6d is a flowchart illustrating the steps required to remove a setting from the scalability system according to an embodiment of the present invention.

Referring to FIG. 6d, in step 630, System 205 determines if a setting is to be removed. If a setting is to be removed, then in step 632, System 205 traverses table data store 220 until it finds the application specified feature. In step 634, System 205 determines if the application specified feature is in table data store 220. If the application specified feature is not found, then in step 636, System 205 returns an error message. If the application specified feature is found, then in step 638, System 205 traverses table data store 220 in order to find the application specified setting. In step 640, System 205 determines if the application specified setting is in the data store. If this setting is not found, then in step 636, System 205 returns an error message. If the application specified setting is found, then in step 642, this setting and its corresponding tag, cost, and benefit are removed from table data store 220.

Figure 6E:
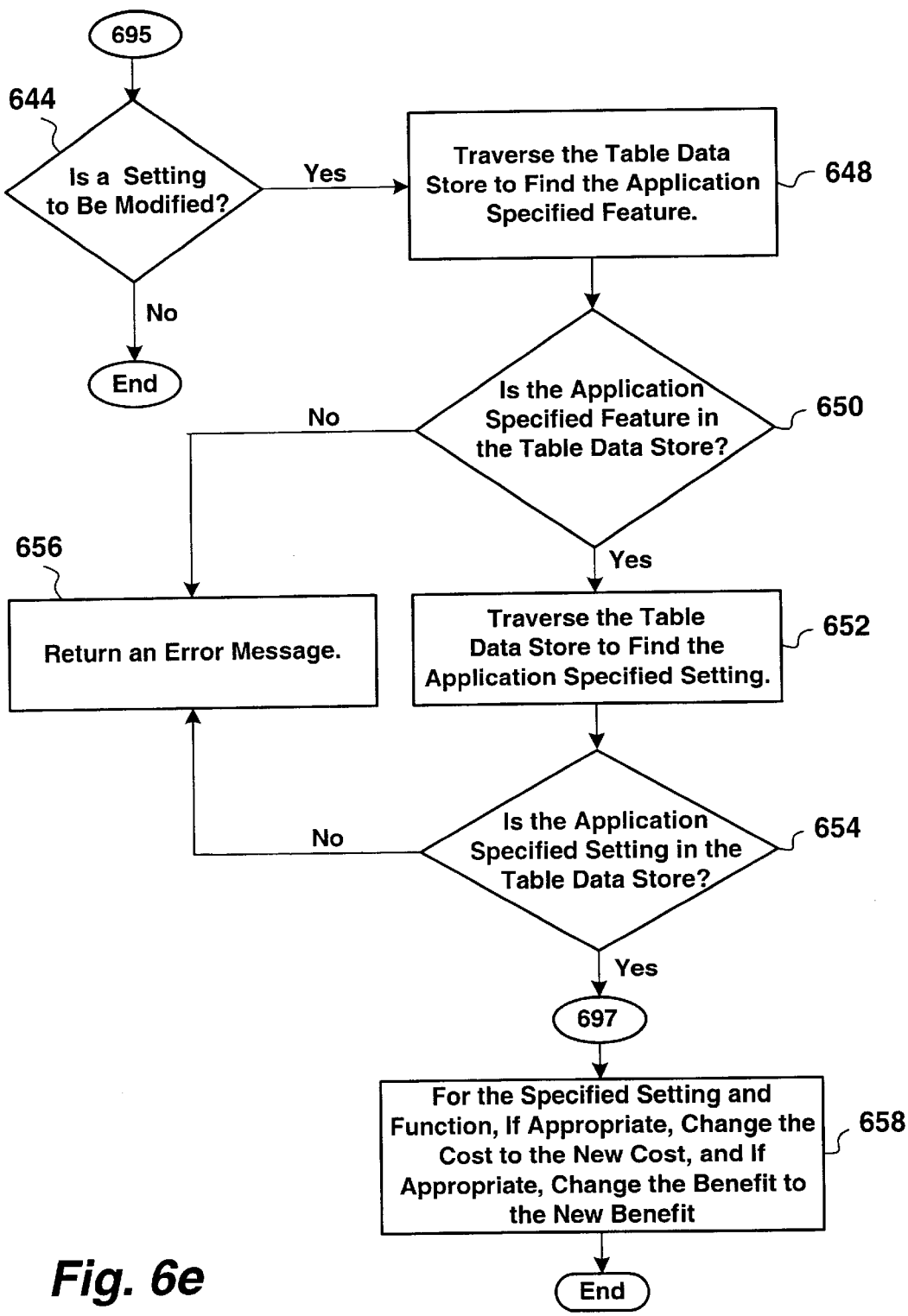
FIG. 6e is a flowchart illustrating the steps required to modify a setting in the scalability system according to an embodiment of the present invention.

Referring to FIG. 6e, in step 644, System 205 determines if a setting is to be modified. If a setting is to be modified, then in step 648, System 205 traverses table data store 220 until it finds the application specified feature. In step 650, System 205 determines if the application specified feature is in table data store 220. If the application specified feature is not found, then in step 656, System 205 returns an error message. If the application specified feature is found, then in step 652, System 205 traverses table data store 220 in order to find the application specified setting. In step 654, System 205 determines if the application specified setting is in the data store. If this setting is not found, then in step 656, System 205 returns an error message. If the application specified setting is found, then in step 658, if the cost is to be modified, then the cost for the setting is changed to the new cost, and if the benefit is to be modified, then the benefit for the setting is changed to the new benefit.

In alternative embodiments, if more than one setting is to be added or removed when a feature is to be added or removed, then all the settings can be sent to System 205 in one call to UpdateFeatures( ) rather than calling UpdateFeatures( ) for each setting that is to be added or removed.

D. RecalculateSettings( ) Portion of Scalability System

Figure 7A:
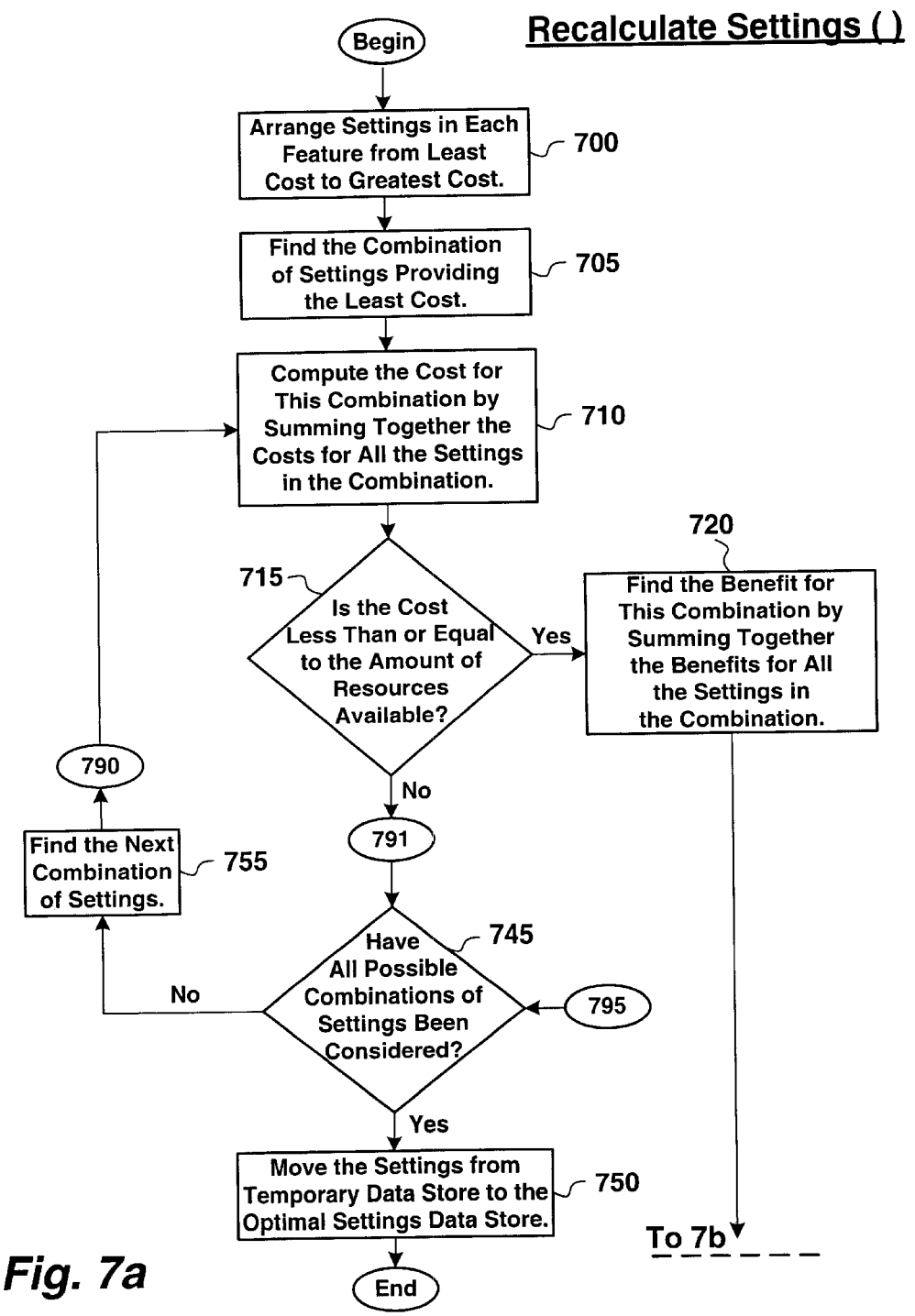
FIG. 7a and 7b are a flowchart illustrating the steps required to calculate the optimum combination of settings according to an embodiment of the present invention.
Figure 7B:
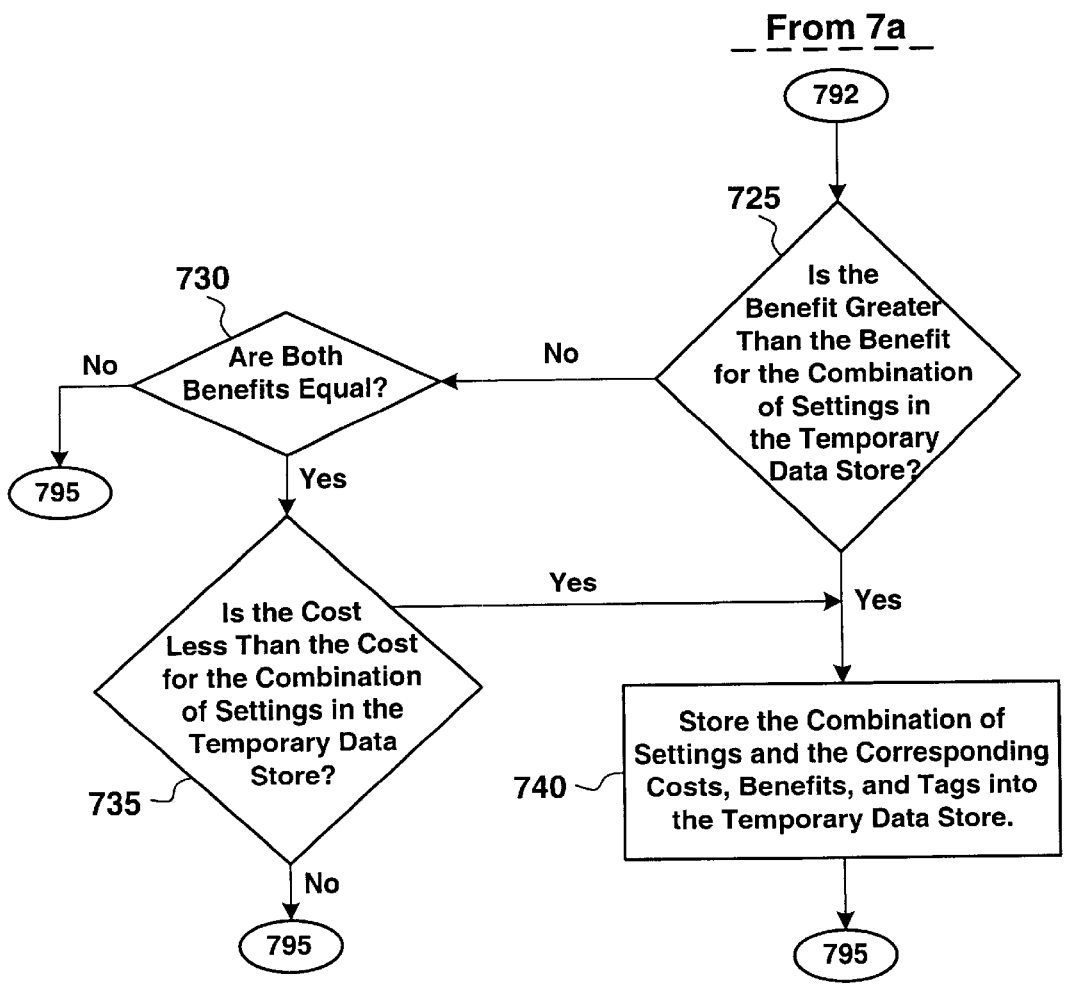

RecalculateSettings( ) is called after the amount of available resources change, after a feature or setting is added, or after a feature or setting is removed. In one embodiment of the present invention, Application 210 sends to RecalculateSettings( ) the amount of resources available. Referring to FIG. 7, in this embodiment, in step 700, System 205 arranges the settings within each feature from least cost to greatest cost. This can be done by for example, using a sorting method such as a bubble sort.

Next, System 205 finds the optimum setting for each feature. In this embodiment, the optimum setting for each feature is found by comparing all the settings of a feature with all of the settings in all the other features in order to find the combination of one or more settings with the greatest benefit given that the cost is less than or equal to the amount of resources available. A temporary data store 225 keeps track of the optimal setting combination as System 205 traverses through all of the settings and its associated costs and benefits. In step 705, System 205 starts the process of comparing all the settings for all the features by finding the combination of settings providing the least cost.

In step 710, the cost for this combination of settings is computed by summing together the costs for one or more settings in the combination ("sum cost"). In step 715, System 205 determines if the sum cost is less than or equal to the amount of resources available. If the sum cost is greater than the amount of resources available, then System 205 goes to step 745. If the sum cost is less than or equal to the amount of resources available, then in step 720, the benefit for this combination of settings is computed by summing together the benefits for all the settings in the combination ("sum benefit"). In step 725, System 205 determines if the sum benefit is greater than the benefit for the combination of settings in temporary data store 225 ("temporary sum benefit"). If the sum benefit is greater than the temporary sum benefit, then in step 740, the combination of settings and their corresponding tags, costs, and benefits are stored in temporary data store 225.

System 205 then goes to step 745. If the sum benefit is not greater than the temporary sum benefit, then in step 730, System 205 determines if both benefits are equal. If both benefits are not equal, then System 205 goes to step 745. If both benefits are equal, then in step 735, System 205 determines if the sum cost is less than or equal to the cost for the combination of settings in temporary data store 225 ("temporary sum cost"). If the sum cost is less than or equal to the temporary sum cost, then in step 740, the combination of settings and their corresponding tags, costs, and benefits are stored in temporary data store 225. If the sum cost is not less than or equal to the temporary sum cost, then System 205 moves to step 745.

In step 745, System 205 determines if all possible combinations of settings have been considered. If all combinations have been analyzed, then in step 750, System 205 moves the settings from temporary data store 225 to optimal settings data store 215. Optimal settings data store 215 will then contain the combination of optimal settings for all the features given the limited amount of resources. If all combinations have not been analyzed, then in step 755, System 205 finds the next combination of settings and then moves to step 710 in order to compute the cost for this new combination of settings. The above steps are repeated for each combination of settings until all combinations of settings have been analyzed.

For instance, in the above example, assume that initially the settings are set to the baseline (for each feature, the setting is set to the one whose cost equals zero and benefit equals zero). Also, assume that the amount of processor resources available has changed to −0.09 (amount of resources available is 9% less than the baseline). The least cost setting for the Motion Estimation Search Range feature is the 15×7 setting which takes 11% less of processor resources than the baseline. The least cost setting for the DCT Precision feature is the Integer setting which is the baseline. The costs for these two settings are added together (the "sum cost" in the earlier description) and checked to make sure that it is less than or equal to the amount of processor resources available. Because the cost for the 15×7 setting added to the cost for the Integer setting results in −0.11 and this is less than −0.09, the tags, costs, and benefits for this combination of settings are stored in temporary data store 225 (i.e., the requirement that the amount of processor resources used be less than 9% below the baseline is easily met by the settings where the amount of processor resources used is 11% below the baseline). The sum benefit for this combination of settings is −0.03.

Then the setting combination of the 15×7 setting for the Motion Estimation Search Range feature and the Floating Point setting for the DCT Precision feature are evaluated. The costs for these two settings are summed together and the resulting sum is checked to make sure that it is less than or equal to the amount of processor resources available. Here, the combined cost for this combination of settings is −0.09 which is equal to the amount of processor resources available. The combined benefits for this combination of settings is −0.02. Because the combined benefits for this combination of settings (with the DCT Precision feature set to Floating Point) is greater than the combined benefit for the earlier combination of settings (with the DCT Precision feature set to Integer) and because the costs for this combination of settings are less than or equal to the amount of processor resources available, the data in temporary data store 225 is replaced with the data for this combination of settings (with the DCT Precision feature set to Floating Point). In this same way, all combinations of settings are explored until the optimal setting combination is found which gives the greatest benefit given a limited amount of resources.

One embodiment for getting the next combination of settings is to, upon each iteration, get a higher cost setting for a feature while the settings of the other features remain constant until all the settings for that one feature have been exhausted. After all the settings for a specific feature have been exhausted, the next higher cost setting is selected for another feature. Then all the settings for the first feature are traversed until they have been exhausted.

For example, if a system has three features (F1, F2, and F3), then the first combination is the least cost combination of settings from F1, F2, and F3. The next combination would be the same settings for F1 and F2 but the next highest cost setting for F3. This process continues until all the settings for F3 have been exhausted. After this, all the settings for F3 will again be traversed but now using the next highest cost setting for F2 and using the same setting for F1. The above procedure is repeated until all possible setting combinations are exhausted.

In alternative embodiments, the settings of each feature are not sorted from least cost to greatest cost but rather the settings are unsorted (are not sorted in any particular order) or are sorted in some other order such as from greatest cost to least cost.

E. ReportSettings( ) Portion of Scalability System

Figure 8:
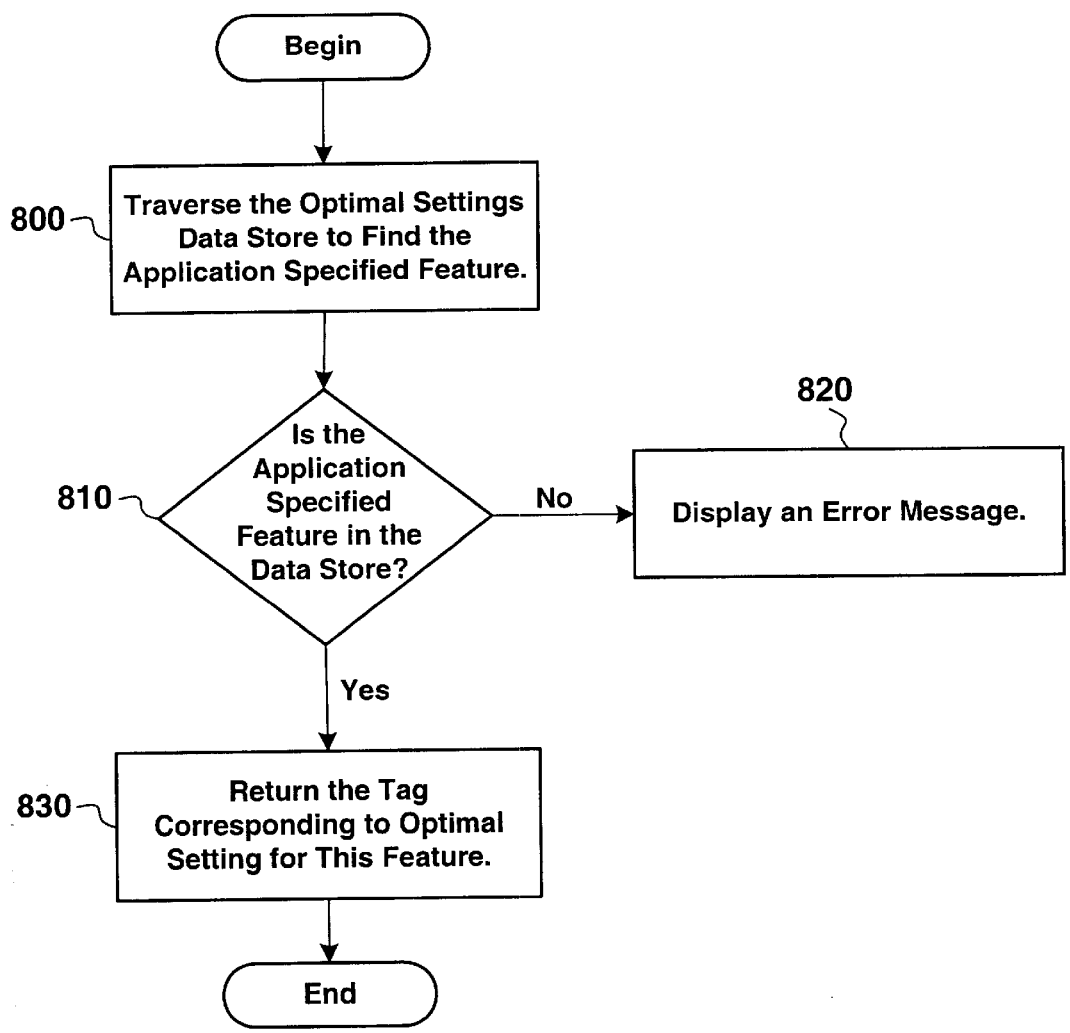
FIG. 8 is a flowchart illustrating the steps required to report the optimum setting for a certain feature according to an embodiment of the present invention.

Application 210 calls ReportSettings( ) in order to find the optimal setting for a certain feature. Referring to FIG. 8, in one embodiment of the present invention, Application 210 calls ReportSettings( ) for each feature that it wants to find the optimal setting. In SetDefaults( ) or RecalculateSettings( ), the optimal setting for each of the features was written to optimal settings data store 215. Here, Application 210 passes to ReportSettings( ) the feature whose optimal setting is to be found. In step 800, optimal settings data store 215 is traversed to find the application specified feature. In step 810, System 205 determines if the feature is in the data store. If the application specified feature is in optimal settings data store 215, then in step 830, the tag corresponding to the optimal setting for this feature is returned to Application 210. If the application specified feature is not in the data store, then in step 820, an error message is displayed.

Alternative embodiments include implementing a routine that locks a particular setting (the setting specified by Application 210) for a feature such that when calculating the optimum combination of settings, that particular setting is always used even if another setting for that feature would provide a more optimum combination of settings. This routine also unlocks a particular setting (the setting specified by Application 210) which was previously locked such that all the settings for that feature can again be used in determining the optimum combination of settings.

Alternative embodiments include when initializing System 205 (using the InitializeSystem( ) routine), having Application 210 send more than one setting at a time for a specific feature (e.g., sending an array of settings corresponding to all the settings of a feature) rather than initializing System 205 one setting at a time.

Although embodiments are specifically illustrated and described herein, it will be appreciated that modifications and variations of the present invention are covered by the above teachings and within the purview of the appended claims without departing from the spirit and intended scope of the invention.

What is claimed is:

1. A method for implementing a modular scalability program comprising:

initializing a set of system parameters with a set of system values provided by a scalable application program;

setting the set of system parameters to a set of default settings;

updating the set of system parameters after a system parameter change;

finding at least one of a first set of optimum system parameters for the set of system parameters after an amount of available resources changes and a second set of optimum system parameters for the set of system parameters after the system parameter change; and reporting at least one of the first set of optimum system parameters and the second set of optimum system parameters.

2. The method of claim 1 wherein the set of system parameters is a set of features, each feature having a set of settings, each setting having a corresponding tag, a corresponding cost, and a corresponding benefit.

3. The method of claim 2 wherein the set of system parameters is initialized by having the scalable application program provide values for the set of features, the set of settings in each feature, and the tag, the cost, and the benefit corresponding to each setting.

4. The method of claim 3 further comprising calculating a sum benefit which is a sum of the benefits corresponding to a particular one of the settings for each of the set of features.

5. The method of claim 4 further comprising calculating a sum cost which is a sum of the costs corresponding to the particular one of the settings for each of the set of features.

6. The method of claim 3 wherein the set of default settings is the set of settings for each of the set of features having a corresponding cost equal to zero and a corresponding benefit equal to zero.

7. The method of claim 3 wherein the set of features is updated when a new application specified feature is added by inserting the new feature and a set of new settings of the new feature, and a corresponding new tag, a corresponding new cost, and a corresponding new benefit for each new setting into the set of features.

8. The method of claim 3 wherein the set of features is updated when an application specified feature is removed by deleting a particular one of the set of features corresponding to the application specified feature.

9. The method of claim 3 wherein the set of features is updated when an application specified new setting is added for an application specified feature by finding a particular one of the set of features corresponding to the application specified feature and inserting the new setting, a new tag corresponding to the new setting, a new cost corresponding to the new setting, and a new benefit corresponding to the new setting into the set of settings for the particular one found feature.

10. The method of claim 3 wherein the set of features is updated when an application specified setting is removed for an application specified feature by finding a particular one of the set of features corresponding to the application specified feature and finding a particular one of the set of settings corresponding to the application specified setting and then removing the particular one found setting.

11. The method of claim 3 wherein the set of features is updated when an application specified setting is modified for an application specified feature by finding a particular one of the set of features corresponding to the application specified feature and finding a particular one of the set of settings corresponding to the application specified setting and if the corresponding cost for that setting is to be modified then changing that cost to a new cost and if the corresponding benefit for that setting is to be modified then changing that benefit to a new benefit.

12. The method of claim 5 wherein the first set of optimum system parameters after the amount of available resources changes is a set of settings having a greatest sum benefit given the sum cost that is less than or equal to the amount of available resources.

13. The method of claim 5 wherein the second set of optimum system parameters after an application specified setting is added is a set of settings having a greatest sum benefit given the sum cost that is less than or equal to or equal to the amount of available resources.

14. The method of claim 5 wherein the second set of optimum system parameters after an application specified setting is removed is a set of settings having a greatest sum benefit given the sum cost that is less than or equal to the amount of available resources.

15. The method of claim 5 wherein the second set of optimum system parameters after an application specified feature is added is a set of settings having a greatest sum benefit given the sum cost that is less than or equal to the amount of available resources.

16. The method of claim 5 wherein the second set of optimum system parameters after an application specified feature is removed is a set of settings having a greatest sum benefit given the sum cost that is less than or equal to the amount of available resources.

17. The method of claim 5 wherein the first set of optimum system parameter is reported by returning to the scalable application program a tag value corresponding to a particular one of the settings for a particular one of the set of features corresponding to an application specified feature and having a greatest sum benefit given the sum cost that is less than or equal to the amount of available resources.

18. The method of claim 5 wherein the second set of optimum system parameter is reported by returning to the scalable application program a tag value corresponding to a particular one of the settings for a particular one of the set of features corresponding to an application specified feature and having a greatest sum benefit given the sum cost that is less than or equal to the amount of available resources.

19. The method of claim 5 further comprising locking the set of settings for an application specified feature such that the locked set of settings is used to calculate the sum benefit and the sum cost.

20. The method of claim 19 further comprising unlocking the set of settings for the application specified feature such that the set of settings is not automatically used to calculate the sum benefit and the sum cost.

21. A computer system providing modular scalability comprising:
  a scalable application program; and
  a modular scalability program performing the following:
    initializes a set of system parameters with a set of system values provided by
    the scalable application program;
    sets the set of system parameters to a set of default settings;
    updates the set of system parameters after a parameter change;
    finds at least one of a first set of optimum system parameters for the set of system parameters after an amount of available resources changes and a second set of optimum system parameters for the set of system parameters after the system parameter change; and
    reports at least one of the first set of optimum system parameters and the second set of optimum system parameters.

22. The system of claim 21 wherein the set of system parameters is a set of features, each feature having a set of settings, each setting having a corresponding tag, a corresponding cost, and a corresponding benefit.

23. The system of claim 22 wherein a table data store stores the set of features.

24. The system of claim 23 wherein the table data store resides on a hard disk.

25. The system of claim 23 wherein the table data store resides on a system memory.

26. The system of claim 22 wherein an optimal settings data store comprises a set of optimal features, each feature having a corresponding optimal setting, each setting have a corresponding tag, a corresponding cost, and a corresponding benefit.

27. A machine-readable medium having stored thereon data representing sequences of instructions, the sequences of instructions including sequence of instructions which, when executed by a processor, cause the processor to perform the steps of:
  initializing a set of system parameters with a set of system values provided by a scalable application program;
  setting the set of system parameters to a set of default settings;
  updating the set of system parameters after a system parameter change;
  finding at least one of a first set of optimum system parameters for the set of system parameters after an amount of available resources changes and a second set of optimum system parameters for the set of system parameters after the system parameter change; and
  reporting at least one of the first set of optimum system parameters and the second set of optimum system parameters.

* * * * *

UNITED STATES PATENT AND TRADEMARK OFFICE
CERTIFICATE OF CORRECTION

PATENT NO. : 6,421,778 B1
DATED : July 16, 2002
INVENTOR(S) : Stephen V. Wood and Jeffrey S. McVeigh It is certified that error appears in the above-identified patent and that said Letters Patent is hereby corrected as shown below:

Column 5,
Line 42, "Pentium(®" should be -- Pentium® --

Column 8,
Line 9, "SetDefaults" should be -- SetDefaults( ) --

Signed and Sealed this

Twenty-fifth Day of March, 2003

JAMES E. ROGAN
*Director of the United States Patent and Trademark Office*